United States Patent
Kubo

(10) Patent No.: US 8,988,701 B2
(45) Date of Patent: Mar. 24, 2015

(54) POWER SUPPLY SYSTEM AND IMAGE FORMING APPARATUS

(71) Applicant: Brother Kogyo Kabushiki Kaisha, Nagoya-shi, Aichi-ken (JP)

(72) Inventor: Isao Kubo, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/259,752

(22) Filed: Apr. 23, 2014

(65) Prior Publication Data
US 2014/0320885 A1   Oct. 30, 2014

(30) Foreign Application Priority Data

Apr. 24, 2013  (JP) .................................. 2013-091365

(51) Int. Cl.
| | | |
|---|---|---|
| G06F 15/00 | (2006.01) | |
| G06F 3/12 | (2006.01) | |
| G06K 1/00 | (2006.01) | |
| G06K 15/00 | (2006.01) | |

(52) U.S. Cl.
CPC .................................. G06K 15/4055 (2013.01)
USPC .......................................... 358/1.14; 358/1.1

(58) Field of Classification Search
CPC ... G06K 15/00; G06K 15/02; G06K 15/4055; G06F 3/1296; G06F 3/0098
USPC .......................................... 358/1.1, 1.14, 1.15
See application file for complete search history.

(56) References Cited

U.S. PATENT DOCUMENTS

| | | | |
|---|---|---|---|
| 2013/0028623 A1 | 1/2013 | Inukai | |
| 2013/0031396 A1 | 1/2013 | Inukai | |
| 2013/0038318 A1 | 2/2013 | Inukai | |
| 2013/0111237 A1* | 5/2013 | Inukai ........................... | 713/320 |

FOREIGN PATENT DOCUMENTS

| | | |
|---|---|---|
| JP | 2000-243584 A | 9/2000 |
| JP | 2013-029417 A | 2/2013 |
| JP | 2013-031337 A | 2/2013 |
| JP | 2013-036885 A | 2/2013 |
| JP | 2013-096902 A | 5/2013 |

* cited by examiner

*Primary Examiner* — Douglas Tran
(74) *Attorney, Agent, or Firm* — Banner & Witcoff, Ltd.

(57) ABSTRACT

A power supply system includes a switching power supply configured to rectify and smooth an AC voltage of an AC power to generate a DC voltage, a controller configured to control the switching power supply to start or stop operating, and a low-capacity power supply comprising a power supply capacity smaller than that of the switching power supply. The low-capacity power supply is configured to supply power to the controller. The power supply system can further include a detecting circuit configured to detect an output voltage of the low-capacity power supply, and a permission circuit configured to permit a startup of the switching power supply when the output voltage detected by the detecting circuit is greater than or equal to a predetermined value.

12 Claims, 3 Drawing Sheets

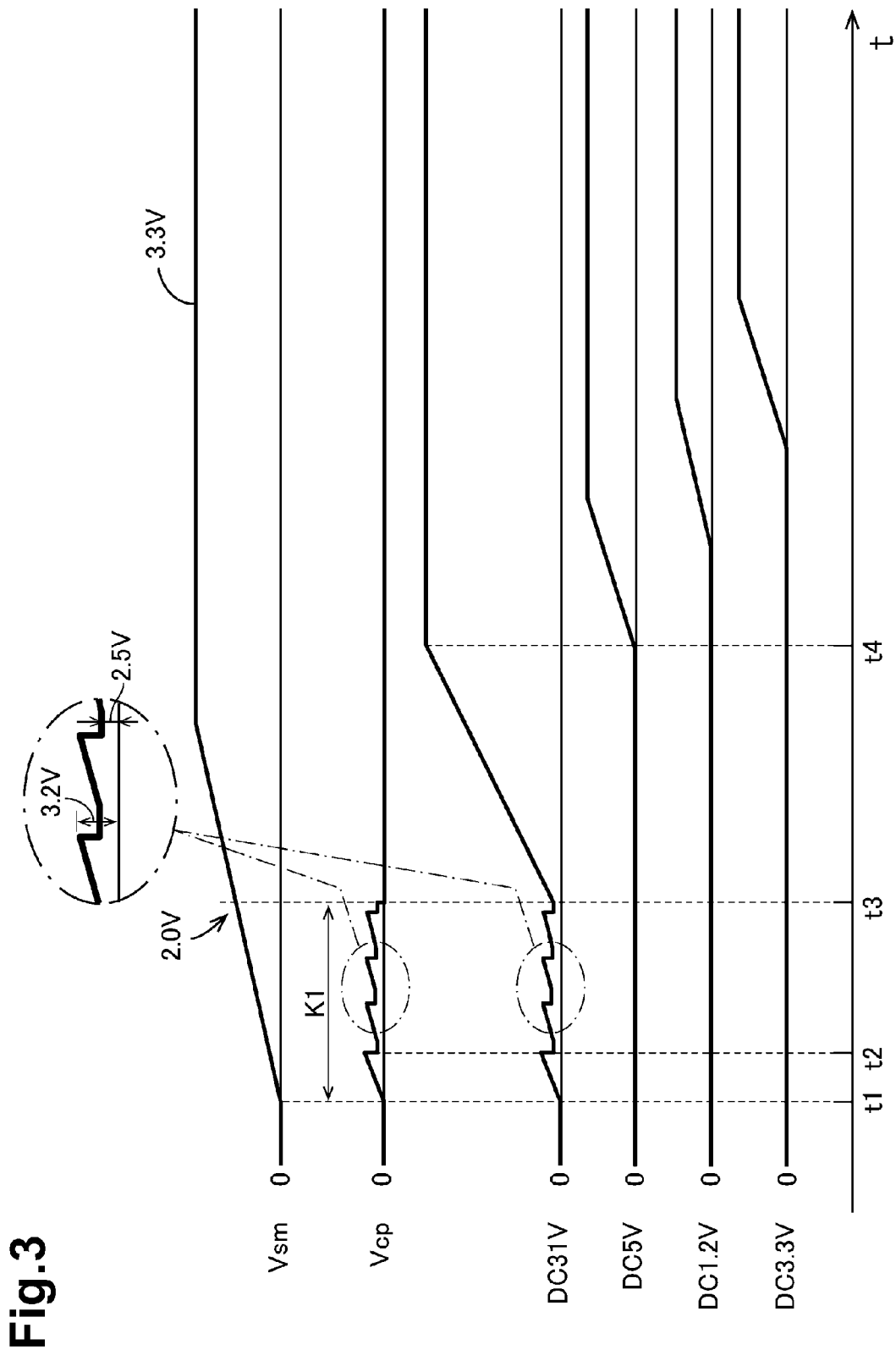

POWER SUPPLY SYSTEM AND IMAGE FORMING APPARATUS

CROSS-REFERENCE TO RELATED APPLICATION

This application claims priority from Japanese Patent Application No. 2013-091365 filed on Apr. 24, 2013, which is incorporated herein by reference in its entirety.

FIELD OF DISCLOSURE

The disclosure relates to a power supply system and an image forming apparatus comprising the power supply system. More specifically, the disclosure relates to the power supply system comprising a switching power supply.

BACKGROUND

A known power supply system comprises a switching power supply. A low-capacity power supply configured to directly rectify and smooth an AC voltage applied to two capacitors is provided separately from the switching power supply. The low-capacity power supply serves as a power supply for a control circuit when the oscillation of the switching power supply is stopped.

When the oscillation of the switching power supply is started with no power supplied from the low-capacity power supply to the control circuit due to an abnormality in a circuit of the low-capacity power supply, malfunction of the control circuit may possibly be caused by, for example, a signal input from a circuit to which power is supplied at the time of the oscillation of the switching power supply.

SUMMARY

The disclosure relates to a technique to increase safety of a power supply system comprising a switching power supply and a low-capacity power supply.

According to an aspect of the disclosure, a power supply system may comprise a switching power supply configured to rectify and smooth an AC voltage of an AC power supply to generate a DC voltage, a controller configured to control the switching power supply to operate or stop, a low-capacity power supply comprising a power supply capacity smaller than that of the switching power supply, the low-capacity power supply configured to supply power to the controller, a detecting circuit configured to detect an output voltage of the low-capacity power supply, and a permission circuit configured to permit startup of the switching power supply when the output voltage detected by the detecting circuit is greater than or equal to a predetermined value.

BRIEF DESCRIPTION OF THE DRAWINGS

Reference now is made to the following description taken in connection with the accompanying drawings.

FIG. 3 is a time chart for operations of the power supply system.

DETAILED DESCRIPTION

An illustrative embodiment will be described referring to FIGS. 1-3.

1. Description of Printer

Figure 1:
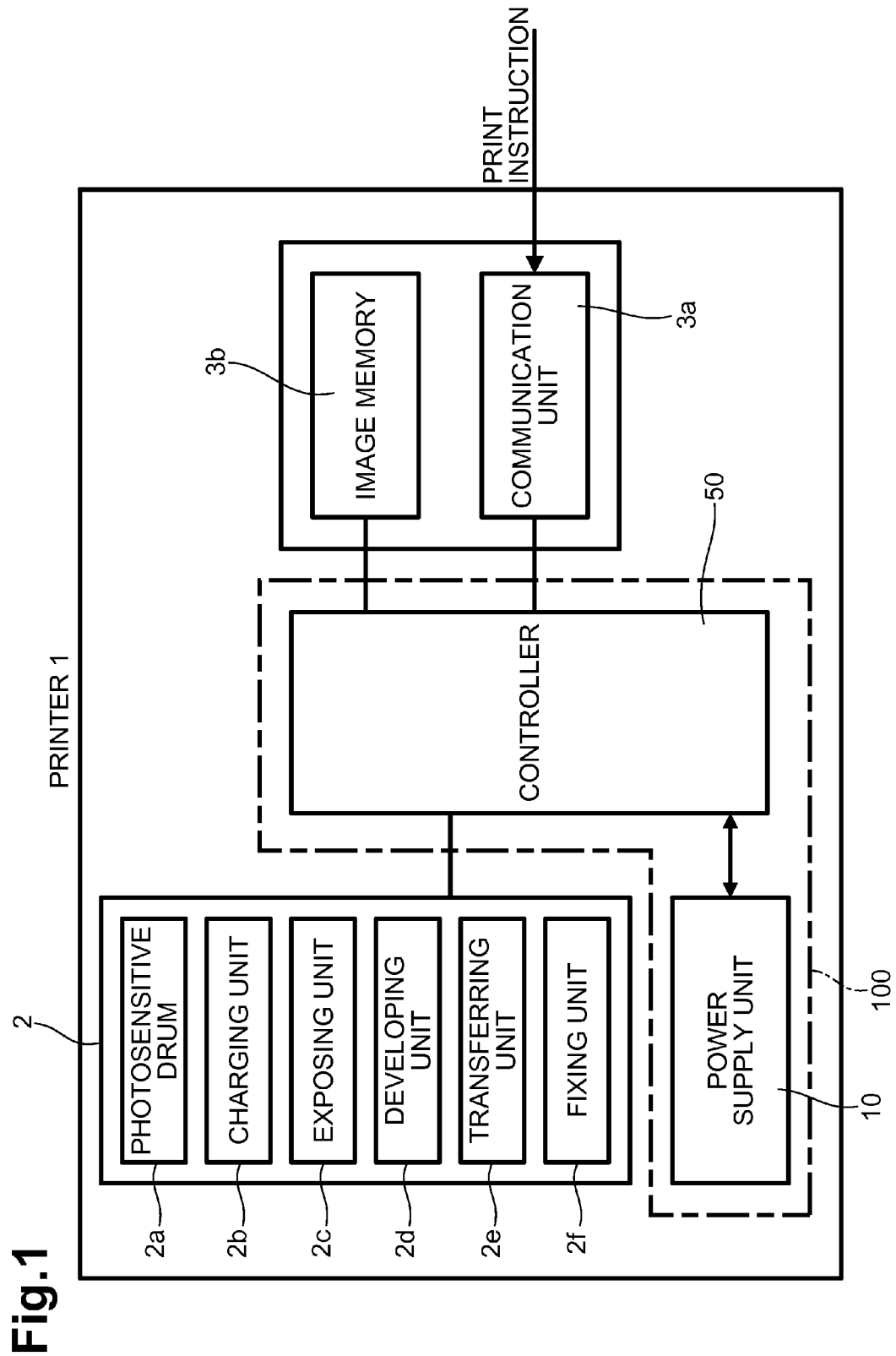
FIG. 1 is a block diagram illustrating a configuration of an image forming apparatus according to an illustrative embodiment.

FIG. 1 is a block diagram illustrating an electrical configuration of an image forming apparatus, e.g., a printer 1. The printer 1 may comprise a printing unit 2, a communication unit 3*a*, an image memory 3*b*, and a power supply system 100. The power supply system 100 may comprise a power supply unit 10 and a controller 50. The power supply unit 10 may function as a power supply of the printer 1. The power supply unit 10 may be configured to supply power to the printing unit 2, the communication unit 3*a*, the image memory 3*b* and the controller 50.

The printing unit 2 may comprise a photosensitive drum 2*a*, a charging unit 2*b* configured to charge a surface of the photosensitive drum 2*a*, an exposing unit 2*c* configured to form an electrostatic latent image on the surface of the photosensitive drum 2*a*, a developing unit 2*d* configured to attach a developer onto the electrostatic latent image formed on the surface of the photosensitive drum 2*a* so as to form a developer image, a transferring unit 2*e* configured to transfer the developer image onto a recording medium, and a fixing unit 2*f* configured to fix the transferred developer image onto the recording medium.

The printing unit 2 may be configured to perform each of the above operations, thereby performing a printing process of printing print data onto a recording medium. The communication unit 3*a* may be configured to perform communication with an information terminal device, e.g., a personal computer (PC), and may have a function of receiving print instructions and print data from the information terminal device. The image memory 3*b* may be configured to temporarily store print data received from the information terminal device.

If the communication unit 3*a* receives a print instruction and receives print data from the information terminal device, the controller 50 may control the printing unit 2 to perform the printing process, so that the printer 1 may print the print data onto a recording medium.

The printer 1 may have a normal mode and a power saving mode as operation modes. In the normal mode, the printer 1 may perform the printing process immediately in response to a print instruction. Therefore, in the normal mode, the power supply system 100 and the controller 50 may be operating, and energizing of the fixing unit 2*f* may be controlled so that the fixing unit 2*f* may be maintained at a temperature at which fixing is possible or a temperature slightly lower than the temperature at which fixing is possible. In the power saving mode, the printer 1 may be placed in a standby state without receiving any print instruction for a predetermined period of time. In the power saving mode, a portion of the power supply system 100 and the controller 50 may be operating, and the fixing unit 2*f* may not be energized.

2. Configuration of Power Supply System

The configuration of the power supply system 100 will be described referring to FIG. 2. The power supply system 100 may comprise a first circuit board, e.g., a power supply circuit board 60A, and a second circuit board, e.g., a main circuit board 60B. The power supply circuit board 60A and the main circuit board 60B may be connected to each other by a connection cable 70. The connection cable 70 may comprise a cable portion 71 and connectors 72A and 72B. Cable wirings of the cable portion 71 may connect the respective terminals T1-T7 of the connector 72A to the corresponding terminals T1-T7 of the connector 72B. For example, a cable wiring connected to the terminal T1 of the connector 72A may be connected to the terminal T1 of the connector 72B. A switching power supply 20 and a low-capacity power supply 30 may be mounted on the power supply circuit board 60A. An application specific integrated circuit (ASIC) 51 and DC-DC converters 28 and 29 may be mounted on the main circuit board 60B.

2-1. Structure of Power Supply Circuit Board

The switching power supply 20 may comprise a rectifying/smoothing circuit 21, an oscillation controller, e.g., a control IC 22, a voltage generating circuit 23, a transformer 24, a switching element, e.g., a field effect transistor (FET) Q1, a rectifying/smoothing circuit 25, and a permission circuit 26. The permission circuit 26 may include a feedback circuit 26A and a voltage change circuit 26B.

The switching power supply 20 may be configured to rectify and smooth an AC voltage Vac of an AC power supply AC to generate a DC voltage of +31 V (hereinafter, referred to as DC 31 V) in the normal mode. The DC 31 V may be supplied to the main circuit board 60B via the connection cable 70.

The rectifying/smoothing circuit 21 may be a so-called capacitor input type, and may comprise a bridge diode configured to rectify the AC voltage Vac (e.g., 240 V) of the AC power supply AC, and a capacitor configured to smooth the rectified voltage. An output of the rectifying/smoothing circuit 21 may be applied to a primary coil of the transformer 24.

The transistor Q1 may be an N-channel MOSFET. The transistor Q1 may be configured to oscillate. The transistor Q1 may be configured to be turned on or off in response to an on/off signal (PWM signal) supplied to a gate of the transistor Q1 from the control IC 22. Accordingly, the primary side of the transformer 24 may oscillate so that a voltage may be induced at a secondary coil of the transformer 24.

The voltage generating circuit 23 may be provided on the primary side of the transformer 24. The voltage generating circuit 23 may be configured to generate a power supply voltage Vcc for the control IC 22 by rectifying and smoothing a voltage induced at an auxiliary coil provided on the primary side of the transformer 24.

The rectifying/smoothing circuit 25 may be configured to rectify and smooth a voltage induced at the secondary coil of the transformer 24, to generate a predetermined DC voltage DC, e.g., DC+31 V.

The feedback circuit 26A may be a known circuit. The feedback circuit 26A may comprise a photocoupler PC1 comprising a light emitting diode LED1, a shunt regulator SR1, and two voltage dividing resistors R1 and R2. The photocoupler PC1 and the shunt regulator SR1 may be connected in series between an output voltage, e.g., a DC voltage DC, and ground Vgd. The voltage dividing resistors R1 and R2 may be configured to divide the DC voltage DC. The divided DC voltage DC may be applied to a reference voltage terminal REF of the shunt regulator SR1 as a reference voltage. The voltage dividing resistors R1 and R2 may be an example of a reference voltage circuit.

The feedback circuit 26A may be configured to make the light emitting diode LED1 of the photocoupler PC1 emit light according to the output voltage DC of the switching power supply 20. The photocoupler PC1 may comprise a phototransistor PT1 connected to a feedback port FB of the control IC 22. Therefore, an optical signal of the light emitting diode LED1 may be converted into an electric signal by the phototransistor PT1. The detected value of the output voltage DC may be fed back to the feedback port FB of the control IC 22. At this time, by an operation of the shunt regulator SR1, the oscillation of the primary side of the transformer 24 may be controlled for the steady output of the output voltage DC, e.g., DC 31 V.

The permission circuit 26 may comprise the feedback circuit 26A. The permission circuit 26 may be configured to permit startup of the switching power supply 20. More specifically, when an output voltage, e.g., a smooth voltage Vsm, detected by a detecting circuit 52 is greater than or equal to a predetermined value, the permission circuit 26 may permit the control IC 22 to make the transistor Q1 oscillate via the feedback circuit 26A, to raise the output voltage DC up to DC 31 V. The "startup of the switching power supply 20" may refer to a startup, for example, to increase the output voltage DC up to 31 V when a power cord of the printer 1 comprising the power supply system 100 is plugged in a socket, and power supply to the power supply system 100 may be started. The "startup of the switching power supply 20" might not refer to a startup or operation of the switching power supply 20 after the low-capacity power supply 30 has been started up when the controller 50 switches operation modes. The "oscillation of the switching element, e.g., the transistor Q1" may refer to a proper oscillation in which oscillation may be continuously performed.

The permission circuit 26 may further comprise a voltage change circuit 26B. The voltage change circuit 26B may be connected to the reference voltage terminal REF of the shunt regulator SR1. When the smooth voltage Vsm detected by the detecting circuit 52 is greater than or equal to the predetermined value, the voltage change circuit 26B may be configured to change the reference voltage applied to the reference voltage terminal REF of the shunt regulator SR1.

The voltage change circuit 26B may comprise a pull-up resistor R3, and a bypass transistor, e.g., a transistor Q2. A first terminal, e.g., a collector of the transistor Q2, may be connected to the DC voltage DC, e.g., the output voltage of the switching power supply 20. A second terminal, e.g., an emitter of the transistor Q2, may be connected to the reference voltage terminal REF of the shunt regulator SR1. A control terminal, e.g., a base of the transistor Q2, may be connected to the DC voltage DC, via the pull-up resistor R3.

The transistor Q2 may be an example of a bypass transistor to bypass the reference voltage circuit. In the illustrative embodiment, the transistor Q2 may comprise a bipolar transistor. The transistor Q2 might not be limited to the bipolar transistor but may be, for example, a field-effect transistor (FET).

The power supply circuit board 60A may comprise a light emitting diode LED2 of a photocoupler PC2. The light emitting diode LED2 may constitute the photocoupler PC2 together with a phototransistor PT2 connected to a control input port EN of the control IC 22 of the switching power supply 20. An anode of the light emitting diode LED2 may be connected to an emitter of a transistor Q4 of the main circuit board 60B, via the connection cable 70.

The control IC 22 may be configured to control the on/off signal for the transistor Q1 in response to a control pulse signal Scp input to the control input port EN, so that oscillation of the primary side of the transformer 24 may be controlled. In the normal mode, the primary side of the transformer 24 may oscillate. In the power saving mode, oscillation of the primary side of the transformer 24 may be stopped. In other words, in the power saving mode, DC 31 V might not be output from the switching power supply 20.

The low-capacity power supply 30 may have a power supply capacity smaller than that of the switching power supply 20. The low-capacity power supply 30 may be configured to supply power to the controller 50, more specifically, to a mode control block B2 of the controller 50, in the power saving mode and the normal mode.

The low-capacity power supply 30 may comprise a first capacitor C1, a second capacitor C2, and a rectifying circuit 31. The first capacitor C1 may comprise a first electrode C1$p$1 and a second electrode C1$p$2. The first electrode C1$p$1 may be connected to one end of the AC power supply AC. The second electrode C1$p$2 may be connected to the rectifying circuit 31.

The second capacitor C2 may comprise a first electrode C2$p$1 and a second electrode C2$p$2. The first electrode C2$p$1 may be connected to the other end of the AC power supply AC. The second electrode C2$p$2 may be connected to the rectifying circuit 31.

The rectifying circuit 31 may be electrically connected between the second electrode C1$p$2 of the first capacitor C1 and the second electrode C2$p$2 of the second capacitor C2. The rectifying circuit 31 may be configured to rectify the AC voltage Vac applied to both capacitors C1 and C2. In the illustrative embodiment, the rectifying circuit 31 may comprise a bridge circuit comprising four diodes D1, D2, D3, and D4. Cathodes of the diodes D1 and D2 may be connected at a first node Nd1. An anode of the diode D1 may be connected to the second electrode C1$p$2 of the first capacitor C1. An anode of the diode D2 may be connected to the second electrode C2$p$2 of the second capacitor C2.

Anodes of the diodes D3 and D4 may be connected at a second node Nd2. A cathode of the diode D3 may be connected to the second electrode C1$p$2 of the first capacitor C1. A cathode of the diode D4 may be connected to the second electrode C2$p$2 of the second capacitor C2. For example, the second node Nd2 may be grounded and may be set to a ground potential Vgd (0 V).

Figure 2:
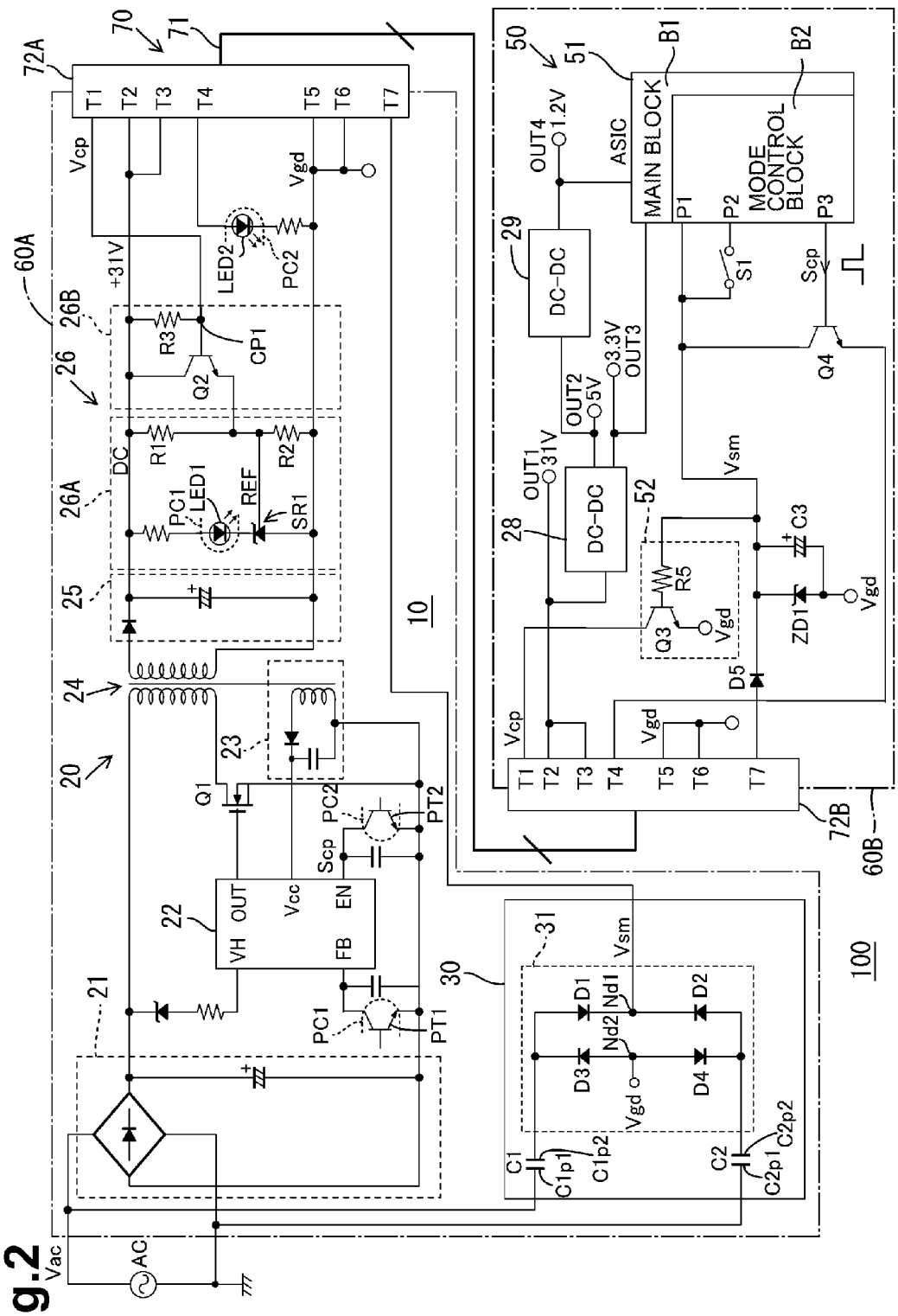
FIG. 2 is a block diagram illustrating a configuration of a power supply system according to an illustrative embodiment.

The structure of the low-capacity power supply 30 might not be limited to that depicted in FIG. 2. For example, the rectifying circuit 31 may comprise a half-wave rectifying circuit.

2-2. Structure of Main Circuit Board

The main circuit board 60B may comprise the controller 50, the detecting circuit 52, the DC-DC converters 28 and 29, a smoothing storage capacitor C3, a Zener diode ZD1, a diode D5, and a transistor Q4. The smoothing storage capacitor C3 and the Zener diode ZD1 may be a portion of the low-capacity power supply 30.

The DC-DC converter 28 may be configured to receive DC 31 V from the switching power supply 20 via the connection cable 70 and convert DC 31 V into DC 5 V and DC 3.3 V. The DC-DC converter 29 may be configured to receive DC 5 V from the DC-DC converter 28 and convert DC 5 V into DC 1.2 V. The DC-DC converter 29 may be configured to generate a permission signal to permit an output of DC 3.3 V based on the output of DC 1.2 V. The DC-DC converter 28 may be configured to output DC 3.3 V based on the permission signal (refer to FIG. 3).

The smoothing storage capacitor C3 may be connected to the rectifying circuit 31, via the connection cable 70. The smoothing storage capacitor C3 may be configured to smooth the rectified AC voltage to generate an output voltage, e.g., a smooth voltage Vsm. The Zener diode ZD1 may be configured to make the smooth voltage Vsm be a predetermined constant voltage, e.g., 3.3 V. The diode D5 may be configured to prevent a backward flow of current from the smoothing storage capacitor C3 to the rectifying circuit 31.

The detecting circuit 52 may comprise a current limiting resistor R5 and a transistor Q3. The detecting circuit 52 may be configured to detect the smooth voltage Vsm output by the low-capacity power supply 30. A base of the transistor Q3 may be connected to the smoothing storage capacitor C3, via the current limiting resistor R5. An emitter of the transistor Q3 may be connected to a ground Vgd. A collector of the transistor Q3 may be connected to a connection point CP1 between the pull-up resistor R3 and the base of the transistor Q2, via the connection cable 70.

The detecting circuit 52 may be configured to connect the connection point CP1 to the ground Vgd when the smooth voltage Vsm is greater than or equal to the predetermined value. More specifically, when the smooth voltage Vsm becomes greater than or equal to, for example, 2.0 V, the transistor Q3 may be turned on. As the transistor Q3 is turned on, the smooth voltage Vsm may be detected. Accordingly, the connection point CP1 may be connected to the ground Vgd. At this time, the transistor Q2 may be turned off, and the reference voltage of the shunt regulator SR1 may be changed to a divided voltage of the DC voltage DC by the voltage dividing resistors R1 and R2.

The structure of the detecting circuit 52 might not be limited to that depicted in FIG. 2.

The controller 50 may comprise an application specific integrated circuit (ASIC) 51. The ASIC 51 may comprise a main block B1 configured to control the printing unit 2 of the printer 1, and a controller, e.g., a mode control block B2, configured to mainly control the modes of the printer 1. In another embodiment, a portion of the mode control may be performed by the main block B1. The main block B1 and the mode control block B2 might not necessarily be configured by the ASIC 51. For example, the main block B1 and the mode control block B2 may be configured by a main CPU and a sub CPU.

The main block B1 may be configured to receive DC 3.3 V from the DC-DC converter 28 and DC 1.2 V from the DC-DC converter 29. The main block B1 may operate only in the normal mode with power supply. When the switching power supply 20 shifts into the output stop mode, e.g., the power saving mode, the power supply may be cut off so that the main block B1 may stop.

The mode control block B2 may comprise a power supply port P1 that may be connected to the low-capacity power supply 30, via the connection cable 70. The power supply port P2 of the mode control block B2 may be configured to receive power from the low-capacity power supply 30 in the normal mode and the power saving mode. The mode control block B2 may be configured to control switching of the switching power supply 20, in response to mode switching of the printer 1 or a user's operation of a switch S1 connected to the port P2, between an output mode in which DC 31 V may be output and an output stop mode in which oscillation of the switching power supply 20 may stop.

More specifically, the mode control block B2 may be configured to output the control pulse signal Scp to the control IC 22, via the transistor Q4 and the photocoupler PC2, to switch the switching power supply 20 from the output mode to the output stop mode. When the control pulse signal Scp is output from a control port P3 of the mode control block B2 to a base of the transistor Q4, the control pulse signal Scp may be optically transmitted through the photocoupler PC2 and input to the control input port EN of the control IC 22.

The output mode may be a mode in which the primary side of the transformer 24 may be oscillated to bring the switching power supply 20 into an output state. The output mode may correspond to the normal mode. The output stop mode may be a mode in which the oscillation of the transformer 24 may be stopped to stop the output of the switching power supply 20. The output stop mode may correspond to the power saving mode. As the output of the switching power supply 20 is thus stopped in the power saving mode, the power may be supplied to the controller 50, e.g., the mode control block B2 of the ASIC 51, from the low-capacity power supply circuit 30.

The connector 72A connected to the power supply circuit board 60A may comprise a power supply terminal T7 configured to supply power from the low-capacity power supply 30 to the main circuit board 60B and a detected voltage terminal T1 configured to supply the smooth voltage Vsm detected by the detecting circuit 52 to the permission circuit 26B. As depicted in FIG. 2, the power supply terminal T7 and the detected voltage terminal T1 may be provided at each end of the connector 72A with a distance therebetween.

When the connector 72A is mounted to the power supply circuit board 60A in a slanting manner, either the power supply terminal T7 or the detected voltage terminal T1 may not be connected to the power supply circuit board 60A because the power supply terminal T7 and the detected voltage terminal T1 are provided at each end of the connector 72A with a distance therebetween. When either the power supply terminal T7 or the detected voltage terminal T1 is not connected to the power supply circuit board 60, the switching power supply 20 might not start up. Therefore, even when the connector 72A is slantingly mounted to the power supply circuit board 60A, safety of the power supply system 100 may be ensured. Therefore, safety of the power supply system 100 may increase. The same may apply to the connection between the connector 72B and the main circuit board 60B.

3. Effects of Illustrative Embodiment

Referring to FIG. 3, for example, when the power cord of the printer 1 is plugged in a socket at a time t1, and power supply to the printer 1 is started, the switching power supply 20 and the low-capacity power supply 30 may start operating. The output voltage of the switching power supply 20, e.g., DC 31 V (the DC voltage DC) and the smooth voltage Vsm may start to increase. In response to the increase of the DC voltage DC, the voltage Vcp of the connection point CP1 between the pull-up resistor R3 and the base of the transistor Q2 may rise. As the voltage Vcp increases to a voltage to turn the transistor Q2 on, e.g., 3.2 V, at a time t2, the transistor Q2 may be turned on and the reference voltage of the shunt regulator SR1 may become the same potential as the DC voltage DC. Accordingly, the current in the light emitting diode LED1 of the photocoupler PCP1 may increase, and the operation of the switching power supply 20 (e.g., rise of the output voltage) may be controlled. At this time, the DC voltage DC may be controlled to the same potential as the internal reference voltage of the shunt regulator SR1, e.g., 2.5 V.

More specifically, when the AC power supply AC is turned on, DC 31 V (the DC voltage DC) may repeatedly go up to a voltage (3.2 V) to turn the transistor Q2 on and down to the same potential as the internal reference voltage of the shunt regulator SR1 (e.g., 2.5 V) in a predetermined period K1 from the time t1 to a time t3. As the smooth voltage Vsm detected by the detecting circuit 52 reaches a predetermined value, e.g., 2.0 V, at the time t3, the transistor Q3 may be turned on and the connection point CP1 may be connected to the ground. At this time, the voltage Vcp of the connection point CP1, e.g., the voltage of the base of the transistor Q2, may be stably maintained at substantially ground potential, and the transistor Q2 may be fixed to off. Accordingly, the reference voltage circuit (e.g., the resistors R1 and R2) may be activated, and the current of the light emitting diode LED may be controlled such that a value of the DC voltage DC may become a value of the DC voltage DC that may be usually output. The switching power supply 20 may be started up at a time t4, and the DC voltage DC may increase to the normal voltage of 31 V.

When the low-capacity power supply 30 has an abnormality or the connection between the connectors 72A and 72B has an abnormality, the switching power supply 20 might not properly start up, and the state of the time t1 to the time t3 may continue.

Thus, as the switching power supply 20 starts up after the low-capacity power supply 30 has been started up, the oscillation of the switching power supply 20 may be properly started up with power supplied from the low-capacity power supply 30 to the ASIC 51. Thus, the switching power supply 20 may be started up safely. In other words, the malfunction of the switching power supply 20 attributable to the ASIC 51 not operating may be reduced when the oscillation of the switching power supply 20 starts up with no power supplied from the low-capacity power supply 30 to the ASIC 51, due to, for example, an abnormality in a circuit of the low-capacity power supply 30. Further, occurrence of malfunction in the ASIC 51 due to a signal input from a circuit to which power may be supplied from the switching power supply 20 at the time of the oscillation of the switching power supply 20, e.g., the DC-DC converters 28 and 29, may be reduced when the oscillation of the switching power supply 20 starts up with no power supplied from the low-capacity power supply 30 to the ASIC 51. In other words, according to an aspect of the illustrative embodiment, the switching power supply 20 may be started up in a state in which the low-capacity power supply 30 may be first started. Therefore, safety of the power supply system 100 comprising the switching power supply 20 and the low-capacity power supply 30 may increase. Accordingly, safety of the printer 1 may also increase.

When the switching power supply 20 starts up, the transistor Q2 may be turned on or off by the output voltage DC of the switching power supply 20 itself, via the pull-up resistor R3. Therefore, circuitry configuration for starting up the switching power supply 20 after the startup of the low-capacity power supply 30 when the printer 1 is turned on may be simplified.

When the switching power supply 20 starts up, oscillation of the switching power supply 20 may be controlled using the known feedback circuit 26A. Therefore, configuration of oscillation control circuitry may be simplified.

Another Illustrative Embodiment

This disclosure is not limited to the specific embodiment described referring to the drawings, but, for example, the following illustrative embodiments may be included in the technical scope of this disclosure.

(1) In the above-described illustrative embodiment, the permission circuit 26 may comprise the feedback circuit 26A. When the smooth voltage Vsm is greater than or equal to the predetermined value, the oscillation of the switching element Q1 may be started by an oscillation controller, e.g., the control IC 22, via the feedback circuit 26A. However, the disclosure might not be limited thereto. For example, the permission circuit may comprise the transistor Q4 and the photocoupler PC2. When the smooth voltage Vsm is greater than or equal to the predetermined value, the control IC 22 may be configured to start the oscillation of the switching element Q1 with the control pulse signal Scp.

(2) In the above-described illustrative embodiment, the feedback circuit 26A may comprise the photocoupler PC1, the shunt regulator SR1, and the reference voltage circuit R1 and R2. However, the disclosure might not be limited thereto.

For example, a feedback circuit may comprise a driving circuit for the photocoupler PC1, instead of the shunt regulator SR1, a comparator configured to compare a reference voltage obtained by dividing the DC voltage by a resistor, with arbitrary reference voltage, and a drive element configured to drive the photocoupler PC1 in response to an output from the comparator.

(3) In the above-described illustrative embodiment, the components of the power supply system 100 may be separately mounted on the power supply circuit board 60A and the main circuit board 60B, and each circuit board 60A and 60B may be connected via the connection cable 70. However, the disclosure might not be limited thereto. The power supply system 100 may be provided on a single circuit board. Components that may be mounted on the circuit boards 60A and 60B may be determined freely and might not be limited to those shown in FIG. 2. For example, the DC-DC converters 28 and 29 may be provided on the power supply circuit board 60A.

(4) The power supply system 100 may be applied to an image forming apparatus in the above-described illustrative embodiment. However, the disclosure might not be limited thereto. The power supply system 100 may be applied to other apparatuses having the normal mode and the power saving mode.

While the disclosure has been described in detail referring to the specific embodiments thereof, this is merely an example, and various changes, arrangements and modifications may be applied therein without departing from the spirit and scope of the disclosure.

What is claimed is:

1. A power supply system comprising:
   a switching power supply configured to rectify and smooth an AC voltage of an AC power supply to generate a DC voltage;
   a controller configured to control the switching power supply to start or stop operating;
   a low-capacity power supply comprising a power supply capacity smaller than that of the switching power supply, the low-capacity power supply configured to supply power to the controller;
   a detecting circuit configured to detect an output voltage of the low-capacity power supply; and
   a permission circuit configured to permit startup of the switching power supply when the output voltage detected by the detecting circuit is greater than or equal to a predetermined value.

2. The power supply system according to claim 1, wherein the switching power supply comprises:
   a transformer having a primary side and a secondary side;
   a switching element connected to the primary side of the transformer; and
   a control circuit configured to control oscillation of the switching element by applying a control signal to the switching element,
   wherein the permission circuit comprises a feedback circuit connected to the secondary side of the transformer, the feedback circuit configured to output a signal based on the generated DC voltage to the control circuit, and
   wherein the permission circuit is configured to permit the control circuit to cause the switching element to oscillate via the feedback circuit to increase the DC voltage up to a predetermined voltage when the output voltage detected by the detecting circuit is greater than or equal to the predetermined value.

3. The power supply system according to claim 2, wherein the feedback circuit comprises:
   a photocoupler;
   a shunt regulator connected in series with the photocoupler between the DC voltage and ground, the shunt regulator comprising a reference voltage terminal; and
   a reference voltage circuit connected to the reference voltage terminal of the shunt regulator, the reference voltage circuit configured to apply a reference voltage to the reference voltage terminal,
   wherein the permission circuit comprises a voltage change circuit connected to the reference voltage terminal of the shunt regulator, and is configured to change the reference voltage of the shunt regulator when the output voltage detected by the detecting circuit is greater than or equal to the predetermined value.

4. The power supply system according to claim 3, wherein the voltage change circuit comprises:
   a pull-up resistor; and
   a bypass transistor comprising a first terminal connected to the DC voltage, a second terminal connected to the reference voltage terminal of the shunt regulator, and a control terminal connected to the DC voltage via the pull-up resistor, and
   wherein the detecting circuit is connected to a connection point between the pull-up resistor and the control terminal of the bypass transistor, and the detecting circuit is configured to connect the connection point to the ground when the output voltage is greater than or equal to the predetermined value.

5. The power supply system according to claim 1, further comprising;
   a first circuit board, wherein the switching power supply, the low-capacity power supply, and the permission circuit are mounted on the first circuit board;
   a second circuit board, wherein the controller and the detecting circuit are mounted on the second circuit board; and
   a connector comprising a plurality of terminals configured to connect the first circuit board and the second circuit board, the terminals comprising a power supply terminal configured to supply power from the low-capacity power supply to the second circuit board, and a detected voltage terminal configured to supply the output voltage detected by the detecting circuit to the permission circuit, and
   wherein the power supply terminal and the detected voltage terminal are disposed on different ends of the connector and spaced apart from each other.

6. The power supply system according to claim 1, wherein the low-capacity power supply comprises:
   a first capacitor comprising a first electrode connected to a first end of the AC power supply, and a second electrode;
   a second capacitor comprising a first electrode connected to a second end of the AC power supply, and a second electrode; and
   a rectifying circuit electrically connected between the second electrode of the first capacitor and the second electrode of the second capacitor, the rectifying circuit configured to rectify an AC voltage applied to the first capacitor and the second capacitor.

7. An image forming apparatus comprising:
   a power supply system comprising:
      a switching power supply configured to rectify and smooth an AC voltage of an AC power supply to generate a DC voltage;
      a controller configured to control the switching power supply to start or stop operating;

a low-capacity power supply comprising a power supply capacity smaller than that of the switching power supply, the low-capacity power supply configured to supply power to the controller;
a detecting circuit configured to detect an output voltage of the low-capacity power supply;
a permission circuit configured to permit startup of the switching power supply when the output voltage detected by the detecting circuit is greater than or equal to a predetermined value; and
an image forming unit configured to form an image using the DC voltage supplied from the switching power supply.

8. The image forming apparatus according to claim 7, wherein the switching power supply comprises:
a transformer having a primary side and a secondary side;
a switching element connected to the primary side of the transformer; and
a control circuit configured to control oscillation of the switching element by applying a control signal to the switching element,
wherein the permission circuit comprises a feedback circuit connected to the secondary side of the transformer, the feedback circuit configured to output a signal based on the generated DC voltage to the control circuit, and
wherein the permission circuit is configured to permit the control circuit to cause the switching element to oscillate via the feedback circuit to increase the DC voltage up to a predetermined voltage when the output voltage detected by the detecting circuit is greater than or equal to the predetermined value.

9. The image forming apparatus according to claim 8, wherein the feedback circuit comprises:
a photocoupler;
a shunt regulator connected in series with the photocoupler between the DC voltage and ground, the shunt regulator comprising a reference voltage terminal; and
a reference voltage circuit connected to the reference voltage terminal of the shunt regulator, the reference voltage circuit configured to apply a reference voltage to the reference voltage terminal,
wherein the permission circuit comprises a voltage change circuit connected to the reference voltage terminal of the shunt regulator, and is configured to change the reference voltage of the shunt regulator when the output voltage detected by the detecting circuit is greater than or equal to the predetermined value.

10. The image forming apparatus according to claim 9, wherein the voltage change circuit comprises:
a pull-up resistor; and
a bypass transistor comprising a first terminal connected to the DC voltage, a second terminal connected to the reference voltage terminal of the shunt regulator, and a control terminal connected to the DC voltage via the pull-up resistor, and
wherein the detecting circuit is connected to a connection point between the pull-up resistor and the control terminal of the bypass transistor, and the detecting circuit is configured to connect the connection point to the ground when the output voltage is greater than or equal to the predetermined value.

11. The image forming apparatus according to claim 7, further comprising;
a first circuit board, wherein the switching power supply, the low-capacity power supply, and the permission circuit are mounted on the first circuit board;
a second circuit board, wherein the controller and the detecting circuit are mounted on the second circuit board; and
a connector comprising a plurality of terminals configured to connect the first circuit board and the second circuit board, the terminals comprising a power supply terminal configured to supply power from the low-capacity power supply to the second circuit board, and a detected voltage terminal configured to supply the output voltage detected by the detecting circuit to the permission circuit, and
wherein the power supply terminal and the detected voltage terminal are disposed on different ends of the connector and spaced apart from each other.

12. The image forming apparatus according to claim 7, wherein the low-capacity power supply comprises:
a first capacitor comprising a first electrode connected to a first end of the AC power supply, and a second electrode;
a second capacitor comprising a first electrode connected to a second end of the AC power supply, and a second electrode; and
a rectifying circuit electrically connected between the second electrode of the first capacitor and the second electrode of the second capacitor, the rectifying circuit configured to rectify an AC voltage applied to the first capacitor and the second capacitor.

* * * * *